(12) United States Patent
Tanaka et al.

(10) Patent No.: US 8,243,187 B2
(45) Date of Patent: Aug. 14, 2012

(54) PHOTOGRAPHING APPARATUS AND PHOTOGRAPHING METHOD

(75) Inventors: Toshiyuki Tanaka, Yokohama (JP);
Toshihiro Hamamura, Yokohama (JE)

(73) Assignee: Samsung Electronics Co., Ltd.,
Suwon-si (KR)

( * ) Notice: Subject to any disclaimer, the term of this patent is extended or adjusted under 35 U.S.C. 154(b) by 639 days.

(21) Appl. No.: 12/099,840

(22) Filed: Apr. 9, 2008

(65) Prior Publication Data

US 2008/0316351 A1     Dec. 25, 2008

(30) Foreign Application Priority Data

Jun. 19, 2007     (JP) .................................. 2007-161545

(51) Int. Cl.
*H04N 5/232* (2006.01)
(52) U.S. Cl. ........................................................ 348/345
(58) Field of Classification Search .................. 348/362,
348/208.12, 326, 345–356, 745; 396/55,
396/79–82, 89–152; 354/400
See application file for complete search history.

(56) References Cited

U.S. PATENT DOCUMENTS

| | | | | |
|---|---|---|---|---|
| 6,614,998 | B1 * | 9/2003 | Senba et al. ................... | 396/123 |
| 7,710,494 | B2 * | 5/2010 | Shiohara et al. .............. | 348/362 |
| 2001/0026683 | A1 * | 10/2001 | Morimoto et al. ............. | 396/89 |
| 2003/0044174 | A1 * | 3/2003 | Endo ............................. | 396/55 |

FOREIGN PATENT DOCUMENTS

| | | | |
|---|---|---|---|
| JP | 03-150975 | * | 6/1991 |
| JP | 2003-195387 A | | 7/2003 |
| JP | 2007-020125 A | | 1/2007 |

OTHER PUBLICATIONS

Office Action established for JP 2007-161545 (Feb. 14, 2012).
Notice of Allowance established for JP 2007-161545 (Jun. 19, 2012).

* cited by examiner

*Primary Examiner* — David Ometz
*Assistant Examiner* — Akshay Trehan
(74) *Attorney, Agent, or Firm* — Drinker Biddle & Reath LLP

(57) ABSTRACT

A photographing apparatus including an in-focus position detector for detecting an in-focus position of a focusing lens to focus an image of a subject on an image pickup surface, a driving controller for controlling the driving of the focusing lens, a reflective member that opens and closes on a path of a light that is irradiated onto the image pickup surface, and an optical measuring unit measuring a brightness of the subject image that is reflected by the reflective member in a closed state when a preliminary light emission operation is performed with respect to the subject before performing a main exposure operation. In the preliminary light emission, the driving controller drives the focusing lens to a position nearer the subject or a position nearer the image pickup surface, rather than to the in-focus position of the focusing lens detected by the in-focus position detector.

20 Claims, 8 Drawing Sheets

PHOTOGRAPHING APPARATUS AND PHOTOGRAPHING METHOD

CROSS-REFERENCE TO RELATED PATENT APPLICATIONS

This application claims the benefit of Japanese Patent Application No. 2007-161545, filed on Jun. 19, 2007, in the Japanese Intellectual Property Office, the entire content of which being incorporated herein in its entirety by reference.

BACKGROUND OF THE INVENTION

1. Field of the Invention

The present invention relates to a photographing apparatus and a photographing method using the photographing apparatus. More particularly, the present invention relates to a photographing apparatus and method to provide a better quality image.

2. Description of the Related Art

When a subject is photographed using an image pickup device, an exposure amount, which is an amount of light irradiated onto a image pickup surface, sometimes may need to be adjusted. If the exposure amount is too much or too small, a clear image cannot be obtained, and thus, it is important that the exposure amount be adjusted appropriately. In addition, during flash photography, a preliminary light emission of the flash occurs before opening/closing of the shutter, the brightness of the preliminary light emission is measured by an optical measuring sensor (e.g. an optical measuring unit), and the photographing apparatus calculates the exposure amount required by the flash in the photographing operation.

Japanese Laid-open Patent No. 2007-20125 discloses an optical measuring sensor, which is installed in a main body of a photographing apparatus and can measure an amount of light of the subject in a preliminary light emission operation. In Japanese Laid-open Patent No. 2007-20125, the light from the subject is reflected by a shutter installed in a main body of the photographing apparatus in the preliminary light emission operation, and the optical measuring sensor measures the light reflected by the shutter.

However, the shutter is installed in the photographing apparatus to be adjacent to a lens rather than an image pickup surface of an image pickup device, such as a charge-coupled device (CCD) or a film. Therefore, a space exists between the shutter and the image pickup surface. In addition, a focusing lens is driven to focus (i.e., to realize an in-focus status) the subject image at the image pickup surface. Therefore, in a conventional image pickup apparatus, the in-focus status is not realized on the surface of the shutter even in the preliminary light emission operation. Thus, the optical measuring sensor measures the light that is incident but not focused on the shutter surface, and exact information about the light cannot be obtained.

In a case where the optical measuring sensor is formed of a cell or a few cells, it is desirable for the light distribution or the light amount to be determined approximately. Also, when a size of the optical measuring sensor is reduced or the number of cells constituting the optical measuring sensor is increased, accurate information about the light should be received in order to utilize the optical measuring sensor.

However, since light is not focused on the shutter surface, persons or objects in the subject image may appear expanded or contours of the persons or objects can become vague. Therefore, in a case where the optical measuring sensor, which has a small size or is formed of a plurality of cells, receives the light reflected by the shutter, information about the light cannot be obtained with high accuracy.

SUMMARY OF THE INVENTION

The embodiments of the present invention provide a photographing apparatus and a photographing method performed using the apparatus, wherein a preliminary light emission operation is performed by driving a focusing lens to focus a subject image on a surface beside an image pickup surface and a brightness of sight is measured by an optical measuring unit with a high accuracy.

A photographing apparatus according to an embodiment of the present invention includes an in-focus position detector for detecting an in-focus position of a focusing lens so that an image of a subject can be focused on an image pickup surface, a driving controller for controlling the driving of the focusing lens, a reflective member that can be opened and closed and is disposed on a path of a light that is irradiated onto the image pickup surface; and an optical measuring unit for measuring a brightness of the light of the subject image that is reflected by the reflective member in a closed state when a preliminary light emission operation is performed with respect to the subject before performing a main exposure operation. In the preliminary light emission operation, the driving controller drives the focusing lens to a position nearer the subject than the in-focus position of the focusing lens or to a position nearer the image pickup surface than the in-focus position of the focusing lens.

In addition, the focusing lens can be driven to a position that is close to a subject or an image pickup surface of the CCD rather than an in-focus position of the focusing lens in the preliminary light emission operation. Also, in the preliminary light emission operation, the optical measuring unit can measure the brightness of light of image that is focused on a subject side or on the image pickup surface and reflected by the reflective member.

In the preliminary light emission operation, the driving controller may drive the focusing lens to a position such that the subject image can be focused on a surface of the reflective member. The surface of the reflective member may be diffusion-processed. Therefore, in the preliminary light emission operation, an optical measuring unit can measure brightness of the light of the subject image that is focused on the surface of the reflective member and reflected by the reflective member.

Furthermore, in the preliminary light emission operation, the driving controller may drive the focusing lens to a position such that the subject image can be focused on the optical measuring unit. The surface of the reflective member may be processed using a mirror-machining method or a Fresnel mirror processing method. Therefore, in the preliminary light emission operation, the optical measuring unit receives the light reflected by the surface of the reflective member and focused on the optical measuring unit to measure the brightness of the light of the subject image.

The reflective member may include a shutter that opens or closes to allow light to be irradiated onto the image pickup surface or to block light from reaching the image pickup surface. Since the shutter that is generally used in the photographing apparatus is used as the reflective member, the number of elements in the photographing apparatus is not increased. In addition, the reflective member can be any member that reflects the image of the subject near the image pickup surface.

In a series of operations for controlling the driving of the focusing lens by the driving controller so that the in-focus position detector can detect the in-focus position of the focusing lens, the driving controller may drive the focusing lens to a position near the subject than the in-focus position of the focusing lens or to a position near the image pickup surface than in-focus position of the focusing lens. Therefore, in a series of operations for controlling the driving of the focusing lens by the driving controller so that the in-focus position detector can detect the in-focus position of the focusing lens, the driving controller can drive the focusing lens to a position that is close to a subject or an image pickup surface of the image pickup device rather than an in-focus position of the focusing lens.

Also, in the series of operations for controlling the driving of the focusing lens by the driving controller in order for the in-focus position detector to detect the in-focus position of the focusing lens, the preliminary light emission operation may be performed. Therefore, the preliminary light emission operation can be performed as a series of operations for controlling the focusing lens by the driving controller so that the in-focus position detector can detect the in-focus position of the focusing lens.

In addition, a photographing method according to an embodiment includes the steps of detecting an in-focus position of a focusing lens so that an image of a subject can be focused on an image pickup surface, closing a reflective member that can be opened or closed and which is disposed on a path of a light irradiated onto the image pickup surface, driving the focusing lens to a position nearer the subject than the in-focus position of the focusing lens or to a position nearer the image pickup surface than the in-focus position of the focusing lens, using a driving controller, and measuring a brightness of the light of the subject image that is reflected by the reflective member in the closed state when a preliminary light emission operation is performed with respect to the subject before performing a main light emission operation.

The reflective member may include a shutter that allows light to be irradiated onto the image pickup surface or blocks light from reaching the image pickup surface.

Hence, as can be appreciated from the above, in the photographing apparatus and photographing method according to the embodiments of the present invention, the preliminary light emission can be performed after driving the focusing lens so as to focus on a surface other than the image pickup surface, and a brightness can be measured accurately by the optical measuring unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
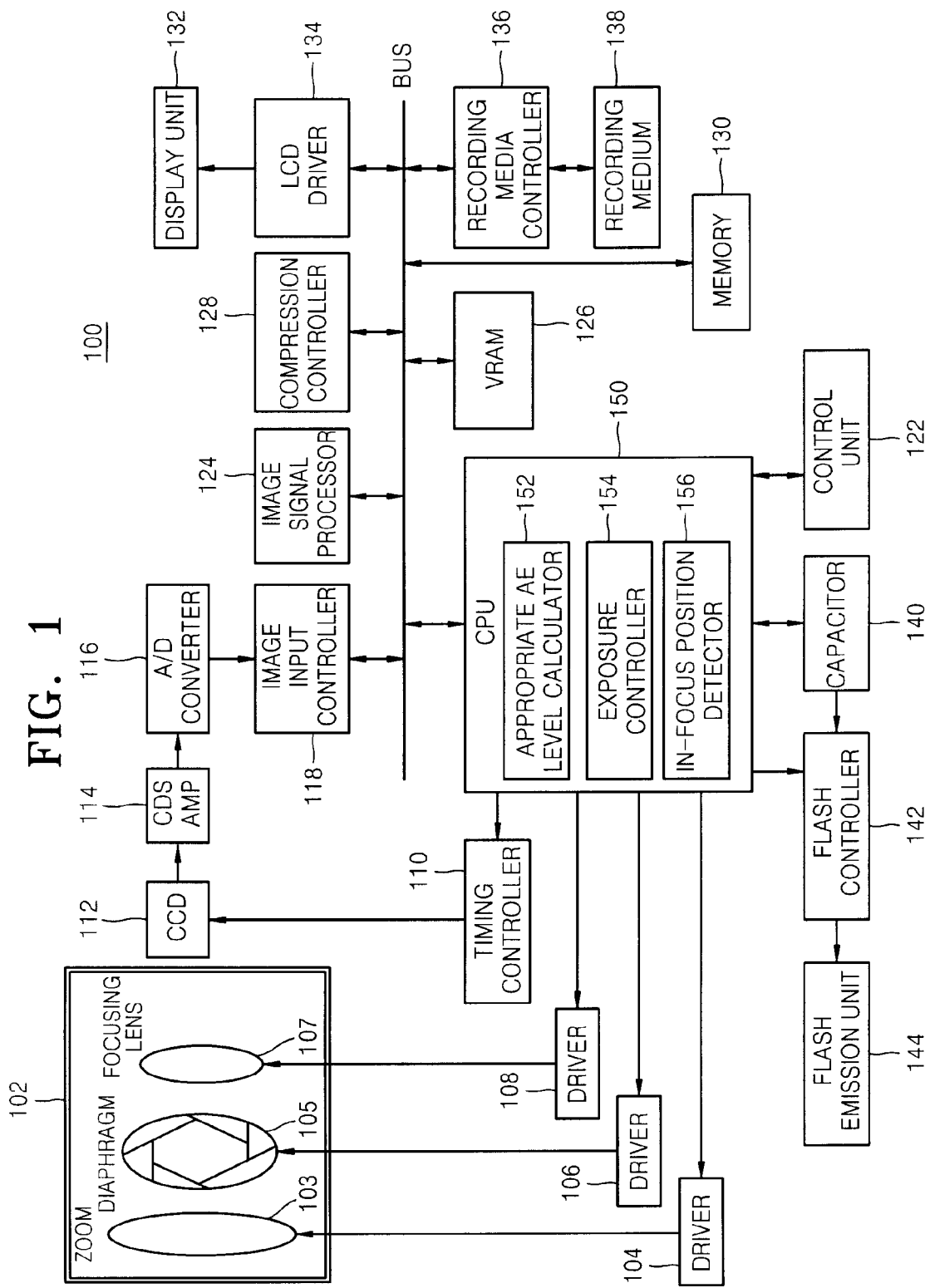
FIG. 1 is a block diagram of an example of a photographing apparatus according to an embodiment of the present invention.

Hereinafter, exemplary embodiments of the present invention will be described in detail by explaining preferred embodiments of the invention with reference to the attached drawings. Like reference numerals in the drawings denote like elements.

Figure 2:
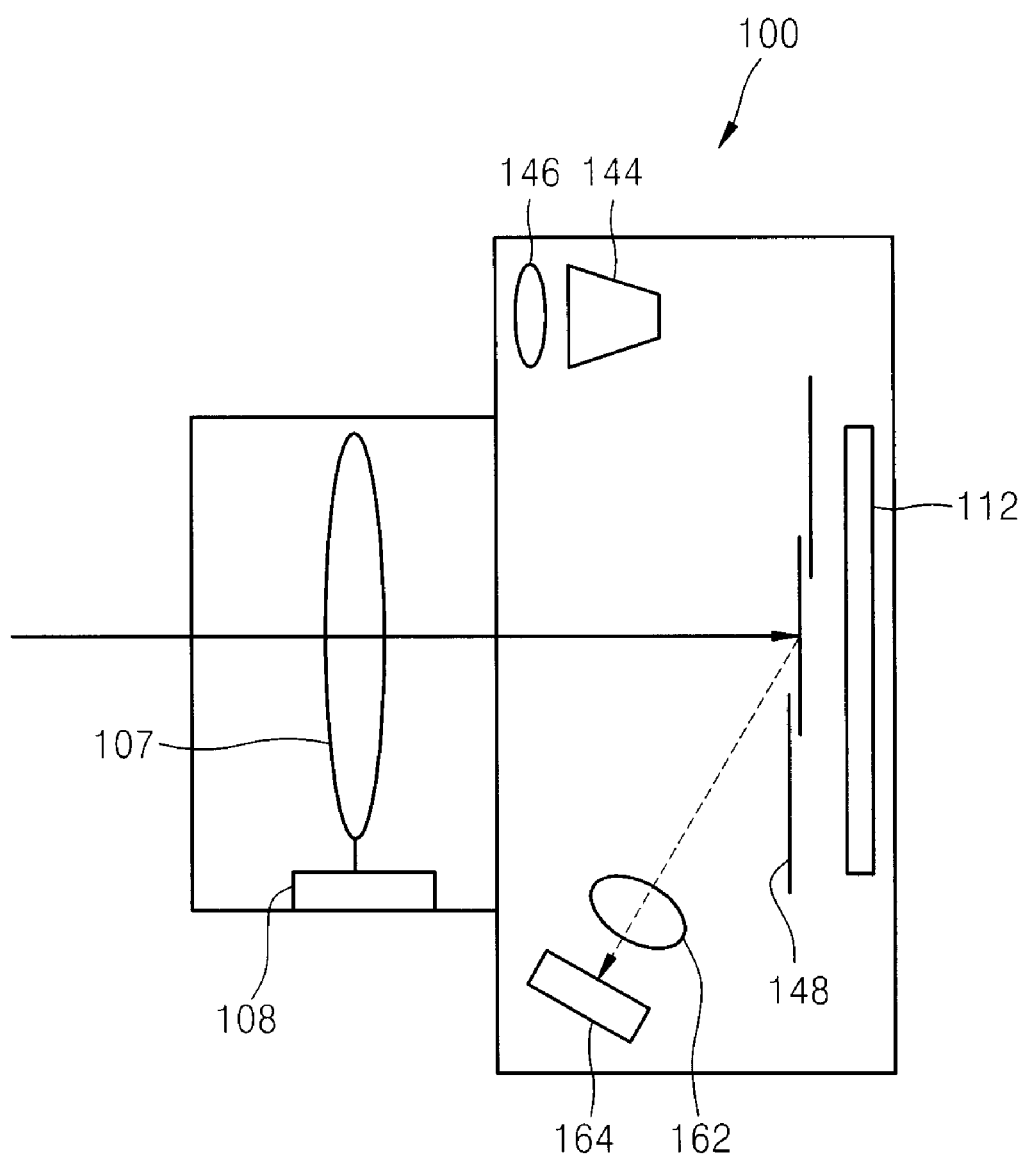
FIG. 2 is a schematic cross-sectional view of the photographing apparatus of FIG. 1, according to an embodiment of the present invention.

An example of a photographing apparatus 100 according to an embodiment of the present invention will be described with reference to FIGS. 1 and 2. FIG. 1 is a block diagram of an example of the photographing apparatus 100, and FIG. 2 is a schematic cross-sectional view of the photographing apparatus 100.

Referring to FIG. 1, the photographing apparatus 100 of this embodiment includes, for example, an optical system 102 on which light is incident from outside, drivers 104, 106, and 108 controlling operations of the optical system 102, a timing controller 110, a charge coupled device (CCD) 112, a correlated double sampling (CDS)/amplifier (AMP) 114, and an analog/digital (A/D) converter 116. The photographing apparatus 100 can further include an image input controller 118, a central processing unit (CPU) 150, a control unit 122, an image signal processor 124, a video random access memory (VRAM) 126, a compression processor 128, a memory 130, a display unit 132, a liquid crystal display (LCD) driver 134, a recording media controller 136, a recording media 138, a capacitor 140, a flash controller 142, and a flash emission unit 144.

The optical system 102 can include a lens (not shown), a zoom mechanism 103, a diaphragm 105, and a focusing lens 107. The optical system 102 focuses an image of a subject passing through the lens on the CCD 112. The zoom mechanism 103 can include a lens that moves back and forth along an optical axis to continuously change a focal distance. The diaphragm 105 adjusts an amount of light incident on the CCD 112. The focusing lens 107 moves back and forth along the optical axis, and adjusts the focused status of the subject image on the CCD 112. Also, in this example, the first driver 104 drives the zoom mechanism 103, the second driver 106 drives the diaphragm 105, and the third driver 108 drives the focusing lens 107.

In addition, the optical system 102 and the drivers 104, 106, and 108 can be integrally installed in the photographing apparatus 100, or can be configured separately from a main body of the photographing apparatus 100 to be disassembled and replaced. In this configuration, the driver 108 is an example of a driving controller. The driver 108 drives the focusing lens 107 to a position that is close to a subject or an image pickup surface of the CCD 112 rather than an in-focus position of the focusing lens 107 detected by an in-focus position detector 156. For example, in a case where a surface of a shutter 148 is diffusion-processed, the driver 108 drives the focusing lens 107 so that the subject can be focused on the surface of the shutter 148.

The timing controller 110 controls the exposure time of each of a plurality of pixels forming the CCD 112 or controls reading of charges. The CCD 112 can be formed of a photoelectric transducer, and generates electric signals according to light incident on the photoelectric transducer. In addition, in this embodiment, the CCD 112 is used as an image pickup device. However, the present invention is not limited to this arrangement, and any suitable device can be used. For example, a complementary metal oxide semiconductor (CMOS) device or other imaging devices can be used as the image pickup device instead of the CCD 112.

The CDS/AMP 114 in this example includes a CDS circuit for removing low frequency noise included in the electric signals generated by the CCD 112 and an amplifier for amplifying the electric signals to a certain level, which are integrally formed with each other. In this embodiment, the CDS circuit and the amplifier are integrally formed with each other in the CDS/AMP 114. However, the CDS circuit and the amplifier can be separately formed.

The A/D converter 116 converts analog electric signals generated in the CCD 112 into digital signals. The image input controller 118 receives an operating command from the CPU 150 to control an input of raw data (e.g., input image data) of images generated by the A/D converter 116 into the memory 130.

The control unit 122 can include a power switch, a mode changing unit, and a shutter key, and is used to set a shutter speed or an ISO sensitivity by a user. The shutter key is a button for performing the image pickup operation. When the shutter key is half-pressed, for example, an auto-focusing (AF) operation for driving the focusing lens 107 to the in-focus position is performed, and when the shutter key is completely pushed, exposure of the CCD 112 occurs and the image pickup operation of the subject is performed.

The VRAM 126 in this example is a memory for displaying images, and has a plurality of channels so that a writing operation of the image and a display of the image on the display unit 132 can be performed simultaneously. The compression processor 128 converts a format of the input image data into a joint photographic experts group (JPEG) format or a Lempel-Ziv-Welch (LZW) format.

The memory 130 can include a semiconductor memory device such as a synchronous DRAM (SDRAM), and temporarily stores the photographed image. The capacity of the memory 130 is such that it can store a plurality of images, and the memory 130 also stores an operational program of the CPU 150.

The image signal processor 124 calculates an evaluation value for auto in-focus operation (AF evaluation value) as contrast information from the image data output from the CCD 112. In addition, the image signal processor 124 compensates a gain of the light amount, processes an edge of the image (contour emphasizing process), and controls a white balance with respect to the image data output from the CCD 112.

The display unit 132 can be, for example, an LCD. The display unit 132 can display images read from the VRAM 126, that is, a live view image before performing the image pickup operation, setting menus of the photographing apparatus 100, or the photographed images. The LCD driver 134 drives the display unit 132, and controls an output of the display unit 132.

The recording media controller 136 controls the write operation of image data onto the recording medium 138, or reading operation of the image data or setting information recorded on the recording medium 138. The recording medium 138 can be formed of, for example, a optical recording medium, an optical magnetic disk, a magnetic disk, or a semiconductor memory medium to record the photographed image data. Also, the recording medium 138 can be detached from the photographing apparatus 100.

The capacitor 140 temporarily accumulates the electric power in order to ensure a power capacity that is required to emit the light in the flash emission unit 144. The flash controller 142 controls the light emission of the flash, and in particular, controls the light emission relating to a reset operation of the CCD 112 or opening/closing operations of the shutter 148. The flash emission unit 144 is used to illuminate the subject when an image capturing operation is performed at night or in a dark place. The light emission of the flash emission unit 144 is controlled when the flash controller 142 receives a signal from the CPU 150 and outputs a light emission command to the flash emission unit 144.

Also, in this example, the flash emission unit 144 performs a preliminary light emission operation before performing the main exposure operation and a main light emission operation during the main exposure operation. The flash emission unit 144 includes a Xe tube emitting the light and a shade for irradiating the light onto the subject, and a Fresnel lens 146 is installed on the subject side in front of the flash emission unit 144.

The CPU 150 performs operations and issues commands for controlling the signals with respect to the CCD 112, CDS/AMP 114, and so forth, and performs operations and issues command for controlling the operation system with respect to the operation of the control unit 112. In this embodiment, only one CPU 150 is included in the photographing apparatus 100. However, any number of CPUs can be employed. That is, a plurality of CPUs can be installed, and in this case, the signal transmission and output of the operation command can be separately performed by different CPUs.

The CPU 150 in this example includes an appropriate auto-exposure (AE) level calculator 152, an exposure controller 154, and an in-focus position detector 156. The appropriate AE level calculator 152 performs an auto exposure of the photographing, and obtains an exposure value (EV). The appropriate AE level calculator 152 calculates an AE (auto exposure) evaluation value. The AE evaluation value can also be calculated by the image signal processor 124.

The exposure controller 154 determines a diaphragm value and a shutter speed when the subject is photographed based on the AE evaluation value calculated by the appropriate AE level calculator 154. The driver 106 or the driver of the shutter 148 is controlled by the determined diaphragm value and the shutter speed.

The in-focus position detector 156 detects a focusing position of the subject from the evaluation value for auto in-focus operation of the image data generated in the image signal processor 124 when the image light is incident onto the CCD 112 from the subject. The shutter 148 controls the exposure time of the CCD 112 when the subject is photographed. Referring to FIG. 2, the shutter 148 is disposed in parallel or substantially in parallel with the image pickup surface of the CCD 112, and is opened or closed in order to irradiate light onto the image pickup surface or block light from reaching the image pickup surface.

The shutter 148 is closed during the preliminary light emission operation, and is opened during the main light emission operation. Here, the surface of the shutter 148 is diffusion-processed using a diffusion process for processing surfaces of metal. In addition, the shutter 148 is an example of a reflective member. Since the shutter that is generally installed in a photographing apparatus is used as the reflective member, the number of elements in the photographing apparatus is not increased. In addition, the reflective member is the shutter 148 in the current embodiment; however, the reflective member of the embodiment of the present invention is not limited to the shutter 148, and other members that can reflect the image of the subject near the image pickup surface of the CCD 112 can be used as the reflective member.

An optical measuring sensor 164 is an example of an optical measuring unit, and measures a brightness of the light of the subject image that is reflected by the shutter 148. The amount of light emission during the main light emission operation of the flash emission unit 144 is determined based on the optical measuring result and the diaphragm value or the appropriate AE evaluation value.

The lens 162 can be installed on a light path between the optical measuring sensor 164 and the shutter 148, and the lens 162 focuses the image of the subject, which was already focused on the surface of the shutter 148, on the optical measuring sensor 164 again.

Next, exemplary operations of the photographing apparatus 100 of the embodiment shown in FIGS. 1 and 2 will be described with reference to FIGS. 3 through 7.

Figure 3:
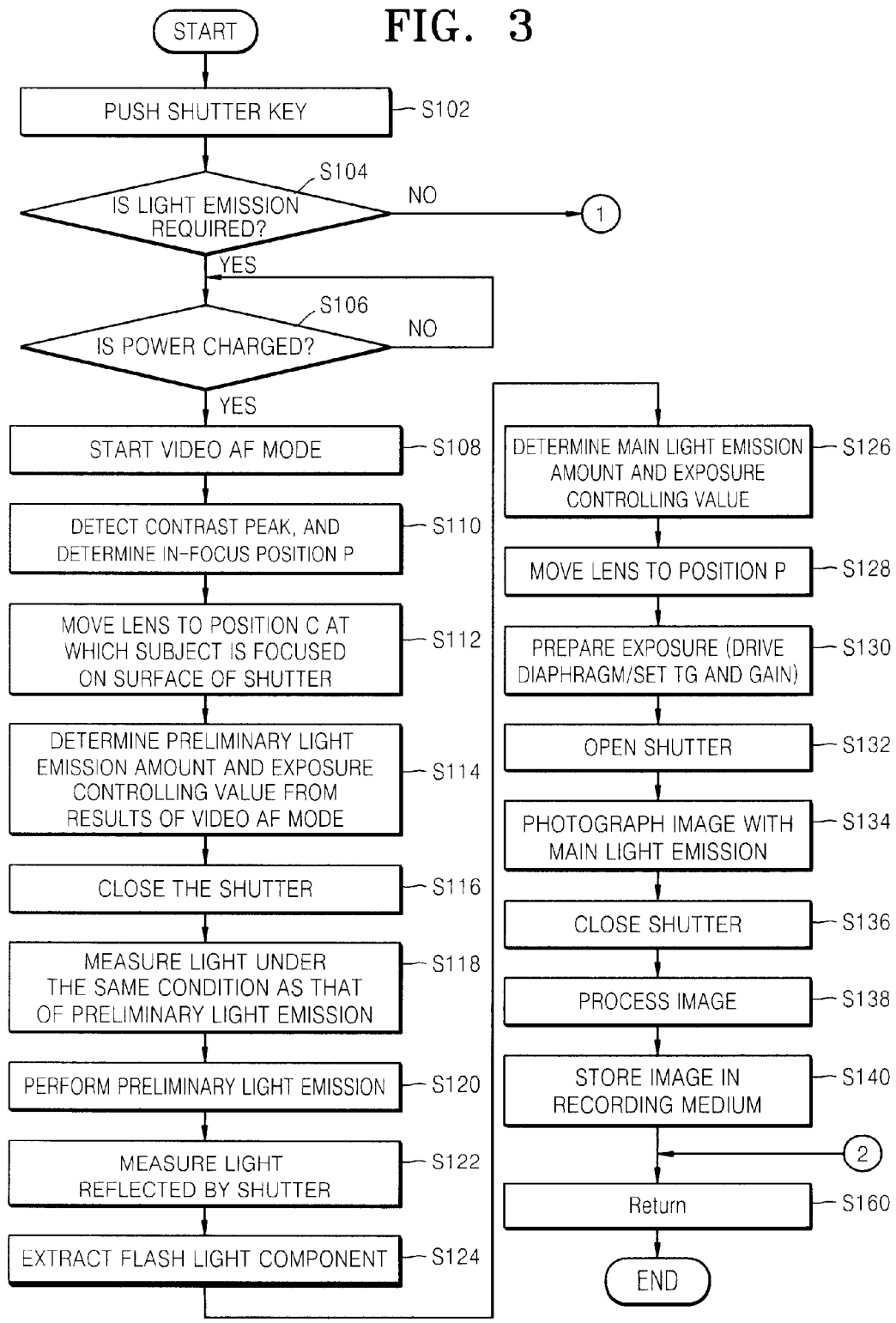
FIGS. 3 and 4 are flowcharts illustrating examples of operations of the photographing apparatus of FIG. 1 according to embodiments of the present invention.
Figure 4:
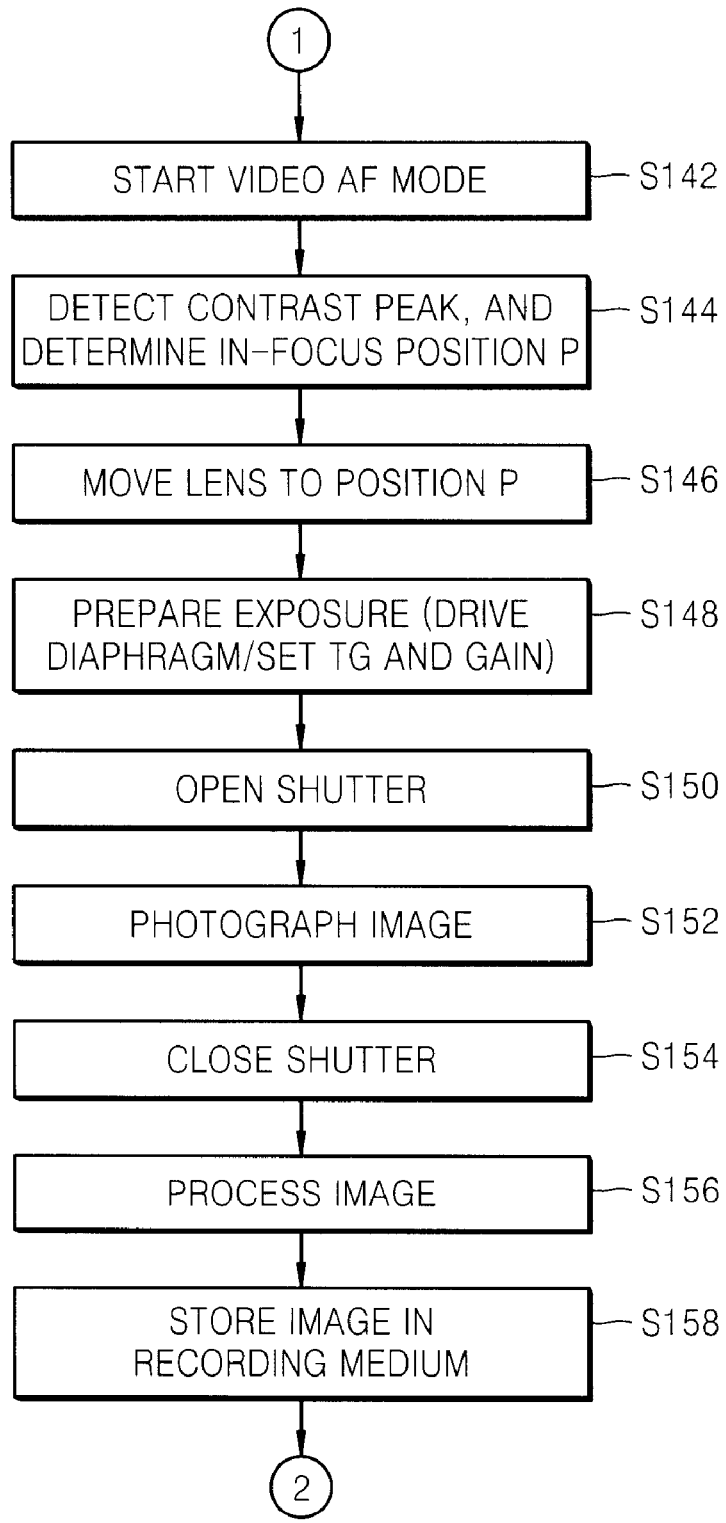
Figure 5:
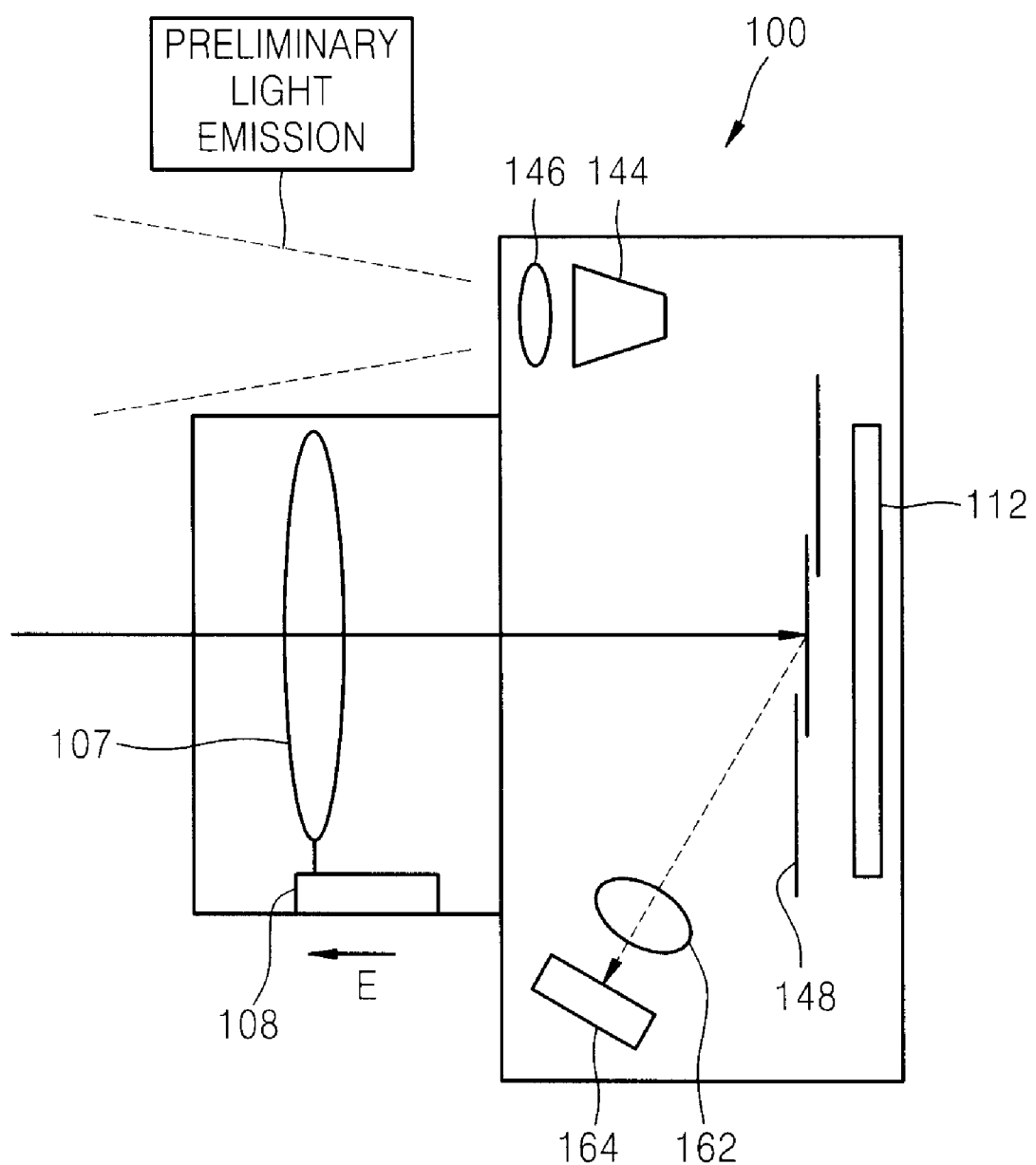
FIG. 5 is a schematic cross-sectional view showing an example of a status of the photographing apparatus of FIG. 1 in a preliminary light emission mode according to an embodiment of the present invention.
Figure 6:
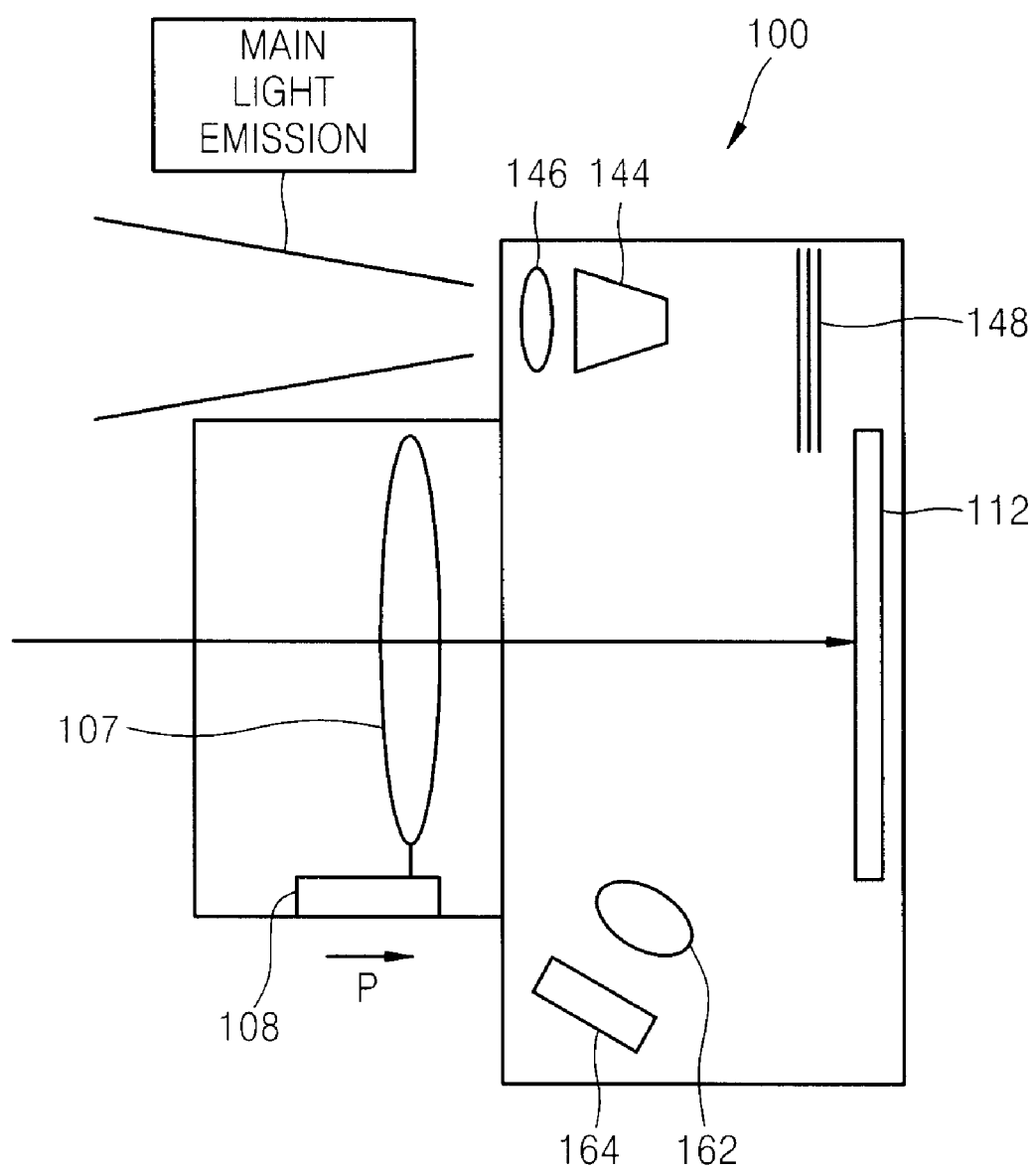
FIG. 6 is a schematic cross-sectional view showing an example of a status of the photographing apparatus of FIG. 1 in a main light emission mode according to an embodiment of the present invention.
Figure 7:
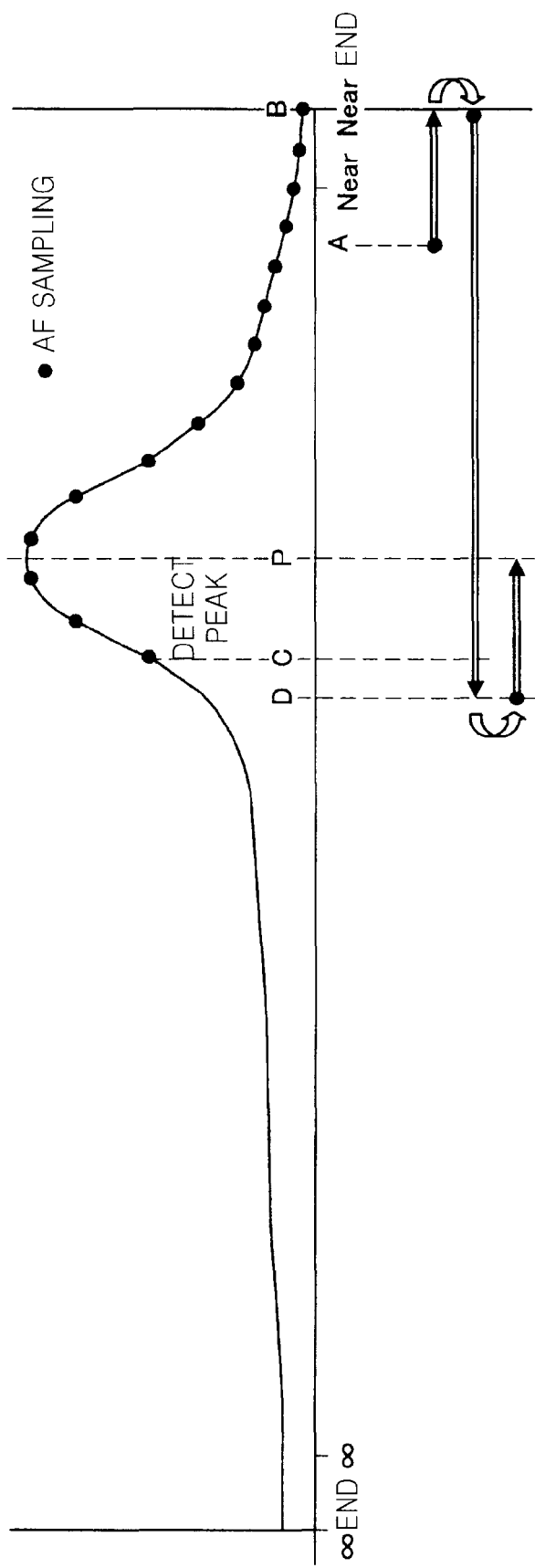
FIG. 7 is a graph showing an example of a relationship between a contrast peak and a location of a focusing lens in the photographing apparatus of FIG. 1, according to an embodiment of the present invention.

FIGS. 3 and 4 are flowcharts illustrating examples of operations of the photographing apparatus 100, according to embodiments of the present invention, and FIG. 5 is a schematic cross-sectional view of the photographing apparatus 100 showing a status of the photographing apparatus 100 in a preliminary light emission mode, according to an embodiment of the present invention. FIG. 6 is a schematic cross-sectional view showing an example of a status of the photographing apparatus 100 in a main light emission mode, according to an embodiment of the present invention, and FIG. 7 is a graph showing an example of a relationship between a contrast peak and a location of the focusing lens 107 in the photographing apparatus 100, according to an embodiment of the present invention.

Referring to FIG. 3, when the shutter key of the control unit 122 is pushed, a photographing operation of the photographing apparatus 100 starts in step S102. Next, the appropriate AE level calculator 152 obtains the EV through the automatic exposure of the photographing apparatus 100, and calculates the AE evaluation value to determine whether the light emission of the flash emission unit 144 is required or not. Otherwise, it can be determined whether the emission of the flash emission unit 144 is required or not according to a forced emission operation of the flash emission unit 144 set by the user in step S104.

In a case where the light emission of the flash emission unit 144 is required, it is determined whether the capacitor 140 has accumulated the power required to emit the light in the flash emission unit 144 in step S106. If it is determined that the capacitor 140 has not accumulated the sufficient power, the photographing apparatus 100 enters a standby mode until the power is charged. If it is determined that the capacitor 140 has completely accumulated the power required, a video AF mode starts in step S108. Here, the shutter 148 is opened to allow the image of the subject to be incident on the CCD 112.

In addition, the image signal processor 124 calculates the AF evaluation value as the contrast information, and the in-focus position detector 156 detects a peak value of the AF evaluation value to determine an in-focus position (P) in step S110. For example, as shown in FIG. 7, when the focusing lens 107 is located at point A, the focusing lens 107 is driven toward the near end position shown in FIG. 7, and after the focusing lens 107 reaches the near end position, the focusing lens 107 is driven toward ∞ end. At this time, the AF evaluation values are sampled at arbitrary intervals. In addition, the position P of the focusing lens 107, at which the AF evaluation value reaches its peak, is determined as the in-focus position. In order to detect the peak value, the focusing lens 107 is continuously driven to the side behind the position P (toward ∞ end portion in FIG. 7) in order to sample the AF evaluation values at the same time.

In addition, when the in-focus position is determined by detecting the peak position P, the driving of the focusing lens 107 is stopped at the point D of FIG. 7. Then, the focusing lens 107 is moved to the point C so that the image of the subject can be focused on the shutter 148 in step S112. In addition, a distance between the point C and the point P is determined according to a distance between the surface of the shutter 148 and the surface of the CCD 112 in the photographing apparatus 100, and is a characteristic value of the photographing apparatus 100.

After determining the position P, the distance between the point C and the point P is stored in the photographing apparatus 100 in advance so that the image of the subject can be focused on the surface of the shutter 148. In addition, the current embodiment can be applied to a sequence of sampling the AF evaluation values around the ∞ end position.

Next, the light amount of the preliminary light emission operation or an exposure amount of the preliminary light emission operation is determined from the results of the video AF mode in step S114. After that, for performing the preliminary light emission operation, the shutter 148 is closed as shown in FIG. 5 in step S116. In addition, the optical measuring sensor 164 measures the brightness of the light of the subject image under the same conditions as that of the preliminary light emission operation, without performing the preliminary light emission operation using the flash emission unit 144 in step S118. Then, the preliminary light emission operation is performed by the flash emission unit 144 in step S120. At this time, the optical measuring sensor 164 measures the brightness of the light of the subject image that is reflected by the shutter 148 in step S122. In addition, an light component of flash is extracted from the brightness difference between the case without performing the preliminary emission operation and the case performing the preliminary emission operation in step S124, and the light emission amount and an exposure control value of the main light emission operation are determined (S126).

Then, the focusing lens 107 is moved to the in-focus position P determined in the previous video AF mode in step S128, and the exposure control for performing the photographing operation is prepared in step S130. The adjustment of the incident light performed by controlling the exposure can be performed in three ways, that is, control of the diaphragm 105, control of the speed of the shutter 148, and control of the gain. That is, the diaphragm 105 is driven by the second driver 106, the shutter speed is set by the timing controller 110 (e.g., timing generator; TG), and the gain is controlled by the CDS/AMP 114.

After that, as shown in FIG. 6, the shutter 148 is opened to perform the exposure of the CCD 112 in step S132, and the image is captured with the main light emission operation performed by the flash emission unit 144 in step S134. In addition, the shutter 148 is closed to terminate the set exposure in step S136. Next, the compression processor 128 processes the image in step S138, and the image data is recorded in the recording medium 138 in step S140.

On the other hand, referring to FIG. 4, in a case where it is determined that light emission by the flash emission unit 144 is not required, the shutter 148 is opened to start the video AF mode in step S142. The image signal processor 124 calculates the AF evaluation value as the contrast information, and the in-focus position detector 156 detects the peak value of the AF evaluation value to determine the in-focus position P in step S144.

Then, the focusing lens 107 is moved to the in-focus position P determined in the previous video AF mode in step S146, and the control of exposure for performing the photographing operation is prepared in step S148. The adjustment of the incident light performed by controlling the exposure can be performed in three ways, that is, control of the diaphragm 105, control of the shutter speed, and control of the gain. That is, the diaphragm 105 is driven by the second driver 106, the shutter speed is set by the timing controller 110 (timing generator; TG), and the gain is controlled by the CDS/AMP 114.

After that, the shutter 148 is opened to start the exposure of the CCD 112 (S150), and the image is captured with the main light emission operation performed by the flash emission unit 144 in step S152. In addition, the shutter 148 is closed to terminate the set exposure in step S154. Next, the compression processor 128 processes the image in step S156, and the image data is recorded in the recording medium 138 in step S158. When the above series of photographing operations are completed, the process is returned to the standby mode in step S160.

According to this embodiment, in the preliminary light emission operation, the focusing lens 107 is driven to a position so that the subject image can be focused on the shutter 148, rather than the position where the subject image is focused on the image pickup surface of the CCD 112. Therefore, the optical measuring sensor 164 can measure the brightness of the light of the subject image in a focused state, and thus, the amount of main light emission required can be determined with high accuracy.

In addition, the driver 108 drives the focusing lens 107 to a position near the subject than the in-focus position, of the focusing lens. Also, the preliminary light emission operation is performed by the third driver 108 in a series of operations of driving the focusing lens 107, so that the in-focus position detector 156 can detect the in-focus position P of the focusing lens 107. As described above, since the preliminary light emission operation is performed in the sequence of the video AF mode, a time lag from the push of the shutter key to the exposure performed by the actual opening/closing operations of the shutter 148 can be reduced.

The embodiments of the present invention are described above with reference to the accompanying drawings; however, the present invention is not limited to these embodiments. Rather, a person of ordinary skill in the art can achieve various modifications within the scope of the present invention disclosed in the claims, and the modifications are also included in the technical scope of the present invention.

Figure 8:
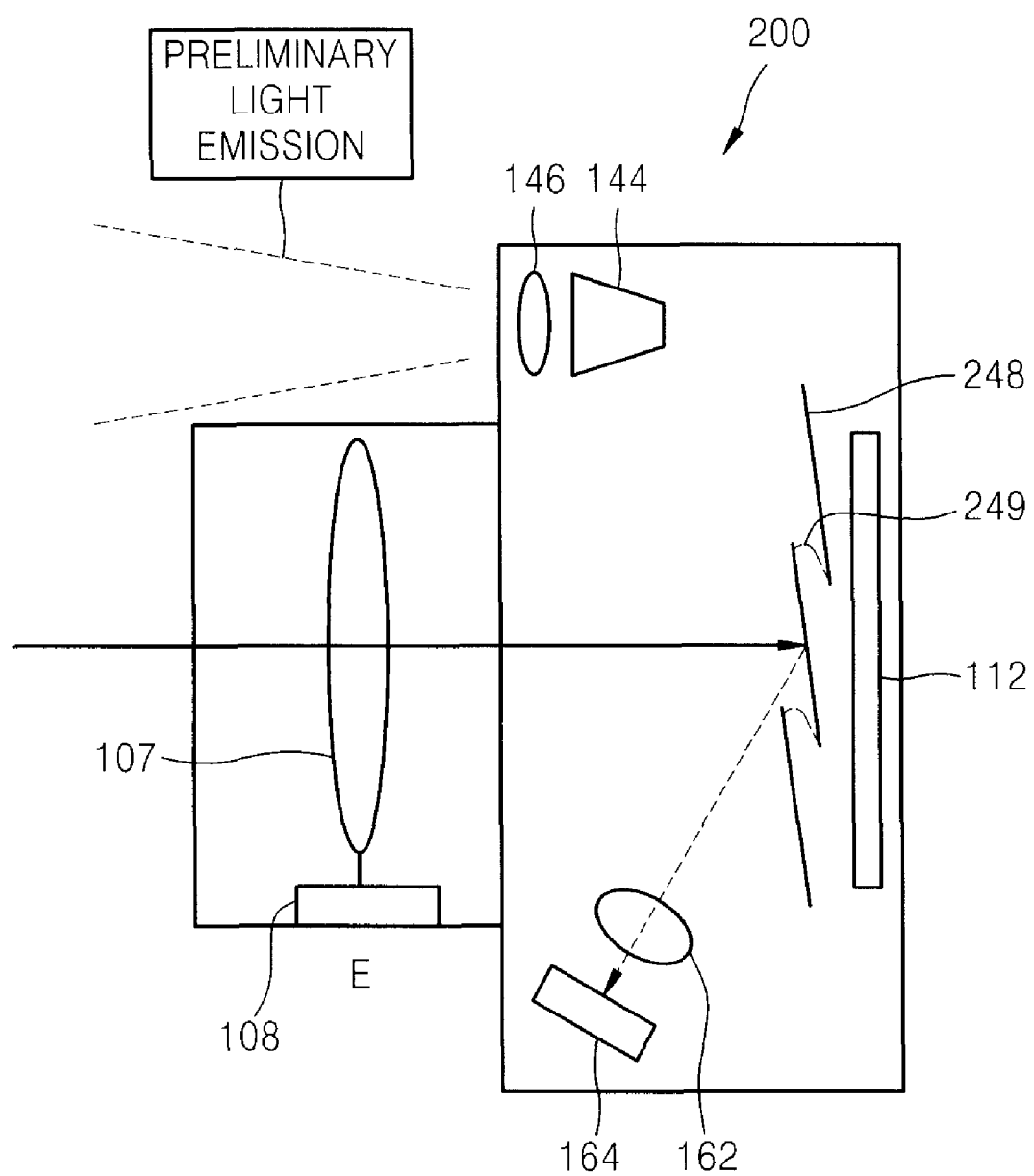
FIG. 8 is a schematic cross-sectional view of an example of a photographing apparatus according to another embodiment of the present invention.

For example, in one of the embodiments described above, the surface of the shutter 148 of the photographing apparatus 100 is diffusion-processed. However, the surface of the shutter 148 can be made in any suitable manner. FIG. 8 is a schematic cross-sectional view illustrating a photographing apparatus 200 according to another embodiment of the present invention. The surface of a shutter 248 of the photographing apparatus 200 illustrated in FIG. 8 is processed using a mirror-machining method to reflect the subject image toward an optical measuring sensor 164. Here, the shutter 248 is inclined so as to reflect the light toward the optical measuring sensor 164. In addition, in a case where the shutter 248 includes two or more sheets, a light shielding valve 249 is installed between the sheets.

Also, in the embodiment illustrated in FIG. 8, a lens 162 installed in front of the optical measuring sensor 164 is a relay optical system, and is controlled so that the subject image can be focused on a surface of the optical measuring sensor 164. In addition, as illustrated in FIG. 2, the shutter 148 can be installed in parallel with the CCD 112 and the surface of the shutter 148 can be processed using a Fresnel-mirror processing method so that the image can be reflected toward the optical measuring sensor 164 without having to incline the shutter 148 as in the shutter 248 of the photographing apparatus 200 of FIG. 8.

In a case where the subject image is reflected by the surface of the shutter 248, which is processed using the mirror-machining method or the Fresnel-mirror processing method like in the current embodiment, the focusing lens 107 is driven to a position nearer the image pickup surface than the in-focus position of the focusing lens in the preliminary light emission operation. Here, the in-focus position is the focusing lens's position by which the subject image is focused on the image pickup surface of the image pickup device 112, and the subject image is focused on the surface of the optical measuring sensor 164. At this time, the optical measuring sensor 164 can measure the brightness of the light of the subject image in a focused status, and thus, the amount of main light emission can be calculated accurately.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus comprising:
   an in-focus position detector for detecting an in-focus position of a focusing lens to realize an in-focus status of an image of a subject on an image pickup surface;
   a driving controller for controlling the driving of the focusing lens;
   a reflective member which opens and closes and is disposed on a path of a light that is irradiated onto the image pickup surface; and
   an optical measuring unit for measuring a brightness of the light of the subject image that is reflected by the reflective member in a closed state when a preliminary light emission operation is performed with respect to the subject before performing a main exposure operation,
   wherein, in the preliminary light emission operation, the driving controller drives the focusing lens to a position nearer the subject than the in-focus position of the focusing lens or to a position nearer the image pickup surface than the in-focus position of the focusing lens, after determining the in-focus position, such that the subject image realizes an in-focus status on at least one of a surface of the reflecting member, and the optical measuring unit.

2. The photographing apparatus of claim 1, wherein, in the preliminary light emission operation, the driving controller drives the focusing lens to a position to realize an in-focus status of the subject image on a surface of the reflective member.

3. The photographing apparatus of claim 2, wherein the surface of the reflective member is diffusion-processed.

4. The photographing apparatus of claim 1, wherein, in the preliminary light emission operation, the driving controller drives the focusing lens to a position to realize an in-focus status of the subject image on the optical measuring unit.

5. The photographing apparatus of claim 4, wherein the surface of the reflective member is processed using a mirror-machining method or a Fresnel mirror processing method.

6. The photographing apparatus of claim 1, wherein the reflective member comprises a shutter that opens or closes to allow light to be irradiated onto the image pickup surface or to block light from reaching the image pickup surface.

7. The photographing apparatus of claim 1, wherein, in a series of operations for controlling the driving of the focusing lens by the driving controller so that the in-focus position detector can detect the in-focus position of the focusing lens, the driving controller drives the focusing lens to a position nearer the subject than the in-focus position of the focusing lens or to a position nearer the image pickup surface than the in-focus position of the focusing lens.

8. The photographing apparatus of claim 1, wherein, in a series of operations for controlling the driving of the focusing lens by the driving controller in order for the in-focus position detector to detect the in-focus position of the focusing lens, the preliminary light emission operation is performed.

9. The photographing apparatus of claim 1, wherein the in-focus position detector detects a peak value of an auto in-focus evaluation value to determine the in-focus position.

10. The photographing apparatus of claim 1, wherein after the preliminary light emission operation, the driving controller drives the focusing lens to the in-focus position for capture of the image.

11. A photographing method comprising:
    detecting an in-focus position of a focusing lens to realize an in-focus status of an image of a subject on an image pickup surface;
    closing a reflective member that is disposed on a path of a light irradiated onto the image pickup surface;
    driving the focusing lens to a position nearer the subject than the in-focus position of the focusing lens or to a position nearer the image pickup surface than the in-focus position of the focusing lens, after the detecting of the in-focus position, such that the subject image realizes an in-focus status on at least one of a surface of the reflecting member and an optical measuring unit; and
    measuring a brightness of the light of the subject image that is reflected by the reflective member in a closed state when a preliminary light emission operation is performed with respect to the subject before performing a main light emission operation.

12. The photographing method of claim 11, wherein, in the preliminary light emission operation, driving the focusing lens to a position to realize an in-focus status of the subject image on a surface of the reflective member.

13. The photographing method of claim 12, wherein the surface of the reflective member is diffusion-processed.

14. The photographing method of claim 11, wherein, in the preliminary light emission operation, driving the focusing lens to a position to realize an in-focus status of the subject image on the optical measuring unit.

15. The photographing method of claim 14, wherein the surface of the reflective member is processed using a mirror-machining method or a Fresnel mirror processing method.

16. The photographing method of claim 11, wherein the reflective member comprises a shutter that allows irradiation of light onto the image pickup surface or blocks light from reaching the image pickup surface.

17. The photographing method of claim 11, wherein, in a series of operations for controlling the driving of the focusing lens so that the in-focus position of the focusing lens is detected, driving the focusing lens to a position nearer the subject than the in-focus position of the focusing lens or to a position nearer the image pickup surface than the in-focus position of the focusing lens.

18. The photographing method of claim 11, wherein, in a series of operations for controlling the driving of the focusing lens in order to detect the in-focus position of the focusing lens, the preliminary light emission operation is performed.

19. The photographing method of claim 11, wherein the detecting includes detecting a peak value of an auto in-focus evaluation value to determine the in-focus position.

20. The photographing method of claim 11, wherein after the preliminary light emission operation, driving the focusing lens to the in-focus position for capture of the image.

* * * * *